United States Patent
Higashino et al.

(10) Patent No.: US 6,885,127 B1
(45) Date of Patent: Apr. 26, 2005

(54) STATOR FOR AN AUTOMOTIVE ALTERNATOR

(75) Inventors: Kyoko Higashino, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,993

(22) Filed: Jul. 26, 2000

(30) Foreign Application Priority Data

Dec. 27, 1999 (JP) ............................................ 11-370254

(51) Int. Cl.$^7$ .......................... H02K 1/00; H02K 19/26; H02K 1/12; H02K 1/22
(52) U.S. Cl. ........................ 310/254; 310/179; 310/180; 310/263
(58) Field of Search ................................. 310/179, 180, 310/263, 254, 268, 186, 260, 216, 51, 49 R; 29/596, 598

(56) References Cited

U.S. PATENT DOCUMENTS

| | | | | |
|---|---|---|---|---|
| 2,371,268 A | * | 3/1945 | Scofield | 310/254 |
| 2,502,121 A | * | 3/1950 | Beard | 310/217 |
| 2,535,004 A | * | 12/1950 | Willits | 310/258 |
| 2,556,013 A | * | 6/1951 | Thomas | 29/609 |
| 2,560,560 A | * | 7/1951 | Doherty | 310/259 |
| 2,761,082 A | * | 8/1956 | Chang | 310/166 |
| 3,824,682 A | * | 7/1974 | Tharman | 29/596 |
| 4,102,040 A | * | 7/1978 | Rich | 29/598 |
| 4,458,184 A | * | 7/1984 | Kawate | 318/254 |
| 4,613,780 A | * | 9/1986 | Fritzsche | 310/216 |
| 4,629,916 A | * | 12/1986 | Oudet | 310/49 R |
| 4,710,667 A | * | 12/1987 | Whiteley | 310/268 |
| 4,780,636 A | * | 10/1988 | Gandhi et al. | 310/216 |
| 4,883,999 A | * | 11/1989 | Hendershot | 310/254 |
| 4,901,428 A | * | 2/1990 | King | 29/596 |
| 4,990,809 A | * | 2/1991 | Artus et al. | 310/192 |
| 5,036,237 A | * | 7/1991 | London | 310/172 |

(Continued)

FOREIGN PATENT DOCUMENTS

| | | |
|---|---|---|
| DE | 196 33 399 A1 | 2/1998 |
| GB | 2 108 772 A | 5/1983 |
| JP | 57186936 | 11/1982 |
| JP | 58108939 | 6/1983 |
| JP | 61042258 | 2/1986 |
| JP | 02084044 | 3/1990 |
| JP | 4-26345 | 1/1992 |
| JP | 04026345 | 1/1992 |
| JP | 04372554 | 12/1992 |
| JP | 09103052 | 4/1997 |
| JP | 09205743 | 8/1997 |
| JP | 09-261900 | 10/1997 |
| JP | 10-210688 | 8/1998 |
| JP | 10234150 | 9/1998 |
| JP | 11-018378 | 1/1999 |

*Primary Examiner*—Tran Nguyen
*Assistant Examiner*—Julio C. Gonzalez
(74) *Attorney, Agent, or Firm*—Sughrue Mion, PLLC

(57) ABSTRACT

A stator for an automotive alternator is provided with good installation characteristics for stator coils and which can lower noise; the stator 8 including, a stator core 122 in which a plurality of slots 125 are formed at an inner circumference thereof and stator coils 23 which are fitted into the slots, and a rotor 6 provided inside the stator 8 so as to be capable of rotating, including, a rotor coil 15 for flowing a current to generate magnetic flux, and a pole core 16 for housing the rotor coil and forming a plurality of claw-shaped magnetic poles in accordance with magnetic flux, and, 2 slots 125 are provided for each set of stator coils, each phase and each magnetic pole and the total number of slots 125 is seventy-two (72) or more, the stator core 122 is such that a plurality of sheet-shaped magnetic members with a plurality of teeth 124 patterning the slots 125 at one side of a yoke 123 are laminated, the stator coils 23 are disposed in the slots 125, and the stator core 122 is rounded such that the stator coils 23 become the inner side thereof and both end surfaces thereof are contacted to connect the stator core 122 in an annular shape.

17 Claims, 7 Drawing Sheets

U.S. PATENT DOCUMENTS

| | | | | |
|---|---|---|---|---|
| 5,122,705 A | * | 6/1992 | Kusase et al. | 310/68 D |
| 5,166,567 A | * | 11/1992 | Kneisley et al. | 310/216 |
| 5,170,083 A | * | 12/1992 | Burgbacher | 310/51 |
| 5,208,503 A | * | 5/1993 | Hisey | 310/259 |
| 5,331,245 A | * | 7/1994 | Burgbacher et al. | 310/186 |
| 5,382,859 A | * | 1/1995 | Huang et al. | 310/216 |
| 5,592,731 A | * | 1/1997 | Huang et al. | 29/596 |
| 5,763,978 A | * | 6/1998 | Uchida et al. | 310/215 |
| 5,778,703 A | * | 7/1998 | Imai et al. | 68/12.02 |
| 5,811,905 A | * | 9/1998 | Tang | 310/179 |
| 5,834,873 A | * | 11/1998 | Muller | 310/173 |
| 5,861,699 A | * | 1/1999 | Kopac | 310/254 |
| 5,986,375 A | | 11/1999 | Umeda et al. | |
| 5,998,903 A | * | 12/1999 | Umeda et al. | 310/179 |
| 6,075,302 A | * | 6/2000 | McCleer | 310/162 |
| 6,137,204 A | * | 10/2000 | Kuwahara | 310/254 |
| 6,147,432 A | * | 11/2000 | Kusase et al. | 310/260 |
| 6,166,471 A | * | 12/2000 | Kometani et al. | 310/198 |
| 6,181,045 B1 | * | 1/2001 | Umeda et al. | 310/201 |
| 6,181,047 B1 | * | 1/2001 | Nitta | 310/254 |
| 6,194,800 B1 | * | 2/2001 | Maruyama et al. | 310/90.5 |
| 6,201,332 B1 | * | 3/2001 | Umeda et al. | 310/184 |
| 6,204,586 B1 | * | 3/2001 | Umeda et al. | 310/179 |
| 6,208,060 B1 | * | 3/2001 | Kusase et al. | 310/254 |
| 6,288,471 B1 | * | 9/2001 | Kometani et al. | 310/254 |
| 6,337,529 B1 | * | 1/2002 | Higashino et al. | 29/596 |
| 6,424,073 B1 | * | 7/2002 | Kometani et al. | 310/263 |
| 6,433,456 B1 | * | 8/2002 | Higashino et al. | 310/263 |

* cited by examiner

STATOR FOR AN AUTOMOTIVE ALTERNATOR

BACKGROUND OF THE INVENTION

1. Field of the Invention

The present invention relates to an alternator driven by an internal combustion engine, and in particular, relates to a stator for an automotive alternator mounted in a vehicle such as a passenger car or truck.

2. Description of the Related Art

FIG. 8 is a sectional side elevation of a conventional automotive alternator. FIG. 9 is a front view of a stator core applied to a stator of a conventional automotive alternator. FIG. 10 is a circuit diagram of a conventional automotive alternator. The conventional automotive alternator shown in the figures includes, a case 3 constructed from an aluminum front bracket 1 and rear bracket 2, a shaft 5 with a pulley 4 fixed on one end thereof provided so as to be capable of rotating inside the case 3, a Lundell rotor 6 fixed to the shaft 5, fans 7 fixed on both sides of the rotor 6, a stator 8 fixed to an inner wall of the case 3, a slip-ring 9 fixed on the other end of the shaft 5 for supplying electric current to the rotor 6, a brush 10 for slidingly contacting the slip-ring 9, a brush holder 11 for receiving the brush 10, rectifiers 12 electrically connected to the stator 8 for rectifying an alternating current produced in the stator 8 into a direct current, a heat sink 13 fitted to the brush holder 11, and a regulator 14 attached to the heat sink 13 for adjusting the magnitude of the alternating voltage produced in the stator 8.

The rotor 6 includes a rotor coil 15 for flowing an electric current to generate magnetic flux and a pole core 16 which houses the rotor coil 15 and forms magnetic poles in accordance with magnetic flux. The pole core 16 includes, a pair of alternately meshed first pole core body 17 and second pole core body 18. The first pole core body 17 and second pole core body 18 are made of iron and have claw-shaped magnetic poles 19, 20 at end portions thereof. Gaps are formed between adjacent claw-shaped magnetic poles 19, 20 so that magnetic flux does not leak between the claw-shaped magnetic poles 19, 20, and also serve as cooling passages for cooling the rotor coil 15.

The stator 8 comprises a stator core 22 and two (2) sets of three-phase stator coils 23, i.e. a conductor wound on the stator core 22 at a phase difference of 30 degrees of electrical angle (see FIGS. 9 and 10). The stator core 22 is formed in an annular shape by punching thin steel sheets in a shape with convexo/concave portions at equidistant intervals and then lap winding or laminating the sheets. Slots 25 and teeth 24 extending in axial directions are formed in a inner portion of the stator core 22.

In the case of this example, there is provided the 2 sets of three-phase stator coils 23, there are twelve (12) magnetic poles of the rotor 6, 2×3 phases correspond to each pole, and seventy-two (72) slots 25 and teeth 24 are formed. The slots 25 are formed in the annular-shaped stator core 22 at a mechanical angle of 5 degrees (360 degrees/72). At this time, since 72 slots uniformly correspond to the 12 poles, the slots 25 are formed at a uniform interval of 30 degrees of electrical angle. The Y—Y connected two sets of three-phase stator coils 23 is provided at a phase difference of 30 degrees of electrical angle in each slot 25, and is electrically connected to the rectifier 12.

In the automotive alternator constructed in this manner, electric current is supplied from a battery (not shown) through the brushes 10 and the slip ring 9 to the rotor coil 15, generating magnetic flux. The claw-shaped magnetic poles of the first pole core 17 are magnetized as north (N) poles by this magnetic flux, and those of the second pole core 18 are magnetized as south (S) poles thereby. Meanwhile, rotational torque from the engine is transmitted through the belt and the pulley 4 to the shaft 5, rotating the rotor 6. Thus, a rotating magnetic field is applied to the stator coils 23, generating electromotive force therein. This alternating electromotive force passes through the rectifiers 12 and is converted into direct current, the magnitude of the current is adjusted by the regulator 14, and the battery is recharged.

In the above automotive alternator, there is one slot 25 for each (1) set of the stator coils 23, each (1) phase and each (1) magnetic pole. Magnetic field leakage is seldom formed between adjacent claw-shaped magnetic poles 19, 20 of the rotor 6 via teeth 24 and the time over which magnetic flux leaks to the teeth 24 is short. Accordingly, there is only a small decrease in the effective magnetic field for the stator coils 23 occurring due to magnetic flux leakage, and surges in the magnetic flux are reduced.

Moreover, an automotive alternator similar to the one described above is shown in Japanese Patent Application Laid-open No. 4-26345.

In a conventional automotive alternator constructed as above, there is a problem in that the insertion time and installation characteristics of the stator coils 23 in the stator core 22 are poor.

FIG. 11 is an electromagnetic field analysis chart drafted by the present inventors. For the conventional automotive alternator, slot opening portions (the abscissa) are spaced a uniform interval of 30 degrees of electrical angle. In another example, with a mechanical angle of 24 degrees, electrical angles of 24 degrees and 36 degrees alternate and the interval is uneven. The ordinate shows ratios of higher harmonic components of magnetomotive force in the stator with respect to a fundamental wave. When the interval of the slot opening portions is equal to 30 degrees, fifth ($5^{th}$) and seventh ($7^{th}$) harmonics are not present in the magnetic flux density waveform. Nevertheless, eleventh ($11^{th}$) and thirteenth ($13^{th}$) higher harmonic components of magnetomotive force in the stator 8 are large, and when $11^{th}$ or $13^{th}$ higher harmonic components of magnetomotive force are present in the rotor 6 there are problems that, surges in magnetic flux cannot be sufficiently suppressed due to interference by the harmonic components and fluctuation in the generated voltage cannot be sufficiently suppressed. Moreover, magnetic attractive force is generated between the claw-shaped magnetic poles 19, 20 of the rotor 6 and the stator 8 and causes the stator 8, case 3 and the like or the claw-shaped magnetic poles 19, 20 of the rotor 6 to resonate which generates a sound that is unpleasant for passengers.

SUMMARY OF THE INVENTION

The present invention aims to solve the above problems with the conventional art and an object of the present invention is to provide a stator for an automotive alternator which has good stator coil installation characteristics, which further has a large effect on surges in magnetic flux and the magnetic attractive force between the stator and a rotor, and which can reduce higher harmonic components of magnetomotive force in the stator.

According to one aspect of the present invention there is provided a stator for an
automotive alternator wherein, in an automotive alternator including:

the stator including, a stator core in which a plurality of slots extending in axial directions are formed at an inner circumference thereof and two sets of three-phase stator coils which are fitted into the slots;

a rotor provided inside the stator so as to be capable of rotating, including, a rotor coil for flowing a current to generate magnetic flux, and a pole core for housing the rotor coil and forming a plurality of claw-shaped magnetic poles in accordance with magnetic flux, and, 2 slots are provided for each phase of stator coils and each magnetic pole and the total number of the slots is 72 or more, the stator core is such that a plurality of sheet-shaped magnetic members with a plurality of teeth patterning the slots at one side of a yoke are laminated, the stator coils are disposed in the slots, and the stator core is rounded such that the stator coils become an inner side thereof and both end surfaces thereof are contacted to connect the stator core in an annular shape.

According to another aspect of the present invention, a mutual interval in the circumferential direction between a center of air gaps of adjacently formed slot opening portions is formed to be uneven.

According to yet another aspect of the present invention, the interval of slot opening portions is a repeated electrical angle of α degrees and (60-α) degrees, and α degrees is in a range of from 16 to 29 degrees.

According to still yet another aspect of the present invention, the interval of slot opening portions is a repeated electrical angle of α degrees and (60-α) degrees, and α degrees is in a range of from 22 to 24 degrees.

According to still yet another aspect of the present invention, the interval of slot opening portions is a repeated electrical angle of 24 degrees and 36 degrees.

According to still yet another aspect of the present invention, projections extending in a circumferential direction are formed on tips the teeth which partition the slots, and a mutual interval in the circumferential direction between a center of air gaps of adjacent slot opening portions is varied by projecting lengths of the projections.

According to still yet another aspect of the present invention, widths of the teeth which partition the slots are uneven.

According to still yet another aspect of the present invention, a contact surfaces of the stator core connected as an annular-shape are formed by dividing a wide tooth among the teeth of uneven widths in a circumferential direction with a substantially orthogonal surface.

BREIF DESCRIPTION OF THE DRAWINGS

DESCRIPTION OF THE PREFERRED EMBODIMENT

Embodiment 1

Figure 1:
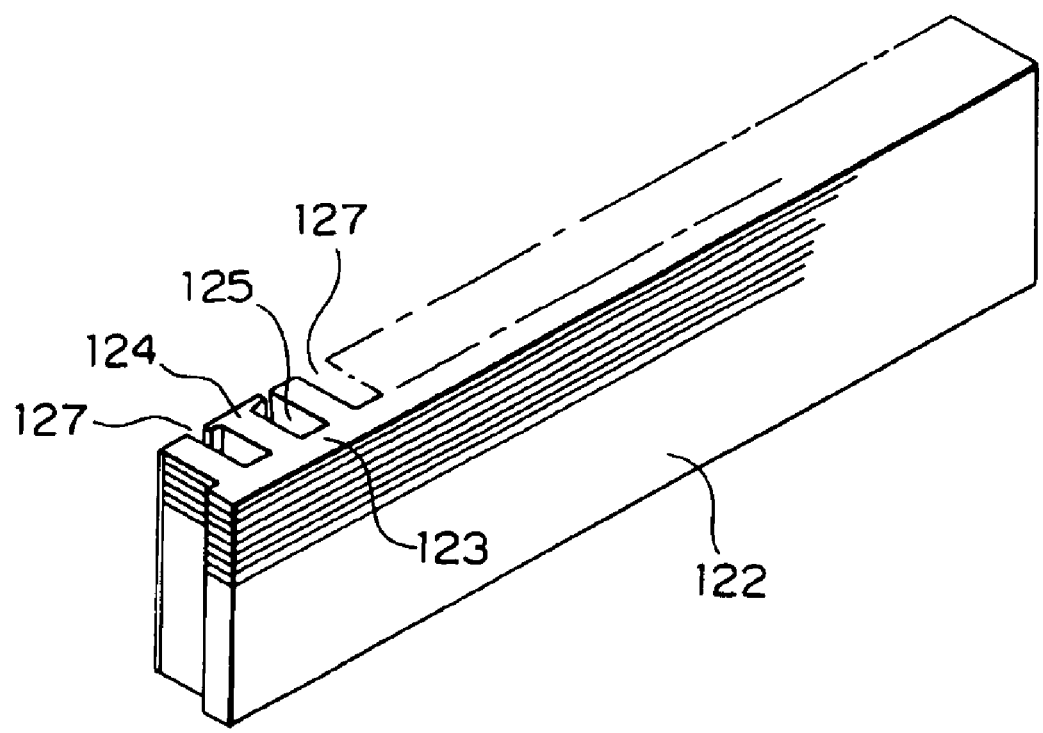
FIG. 1 is a perspective view for explaining a former winding structure of a stator core applied to a stator for a automotive alternator according to the present invention.
Figure 2A:
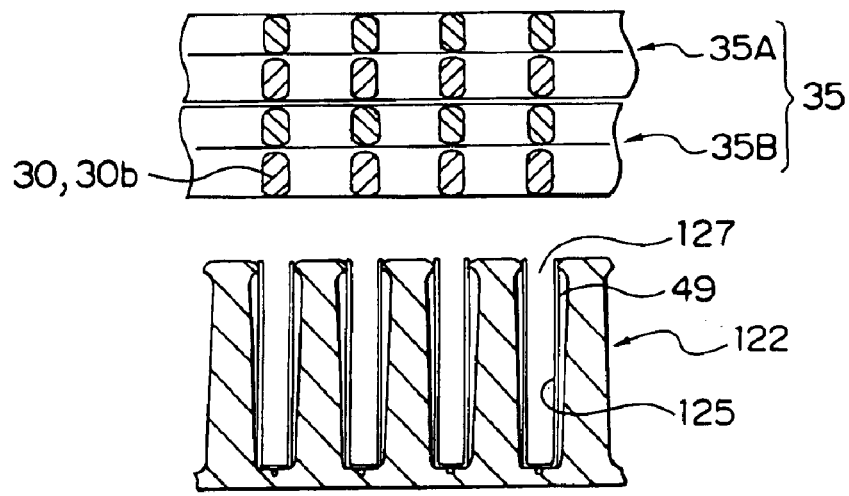
FIGS. 2a, 2b, 2c are a process sectional view for explaining a manufacturing process of a stator core.
Figure 2B:
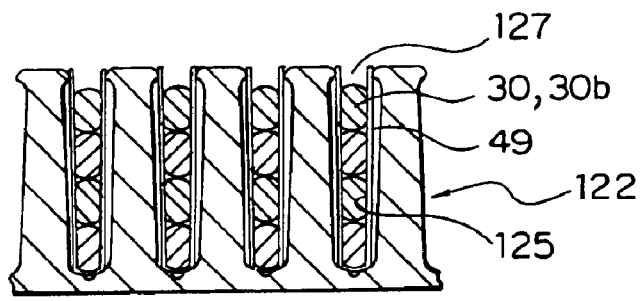
Figure 2C:
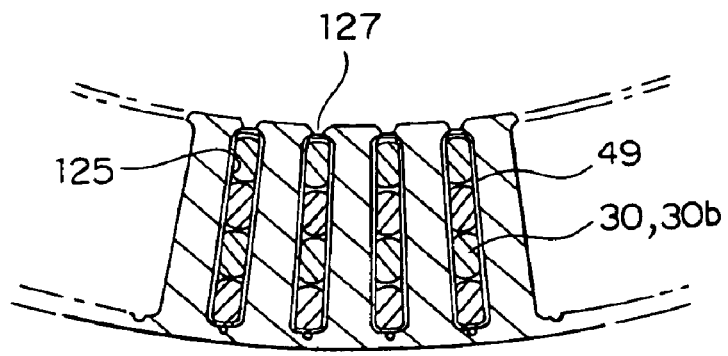
Figure 3:
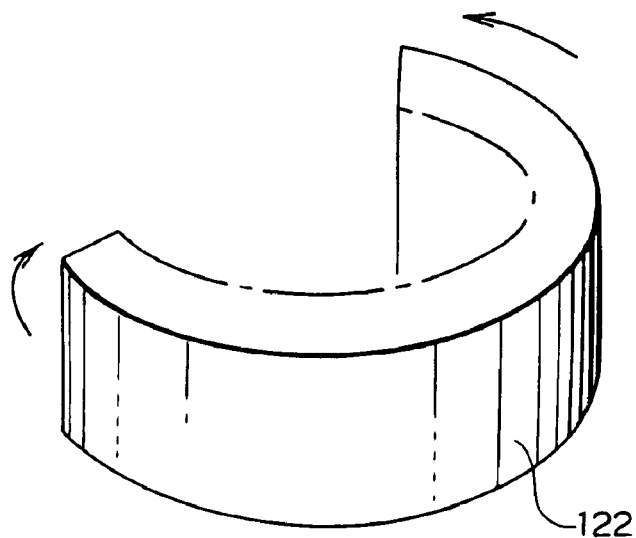
FIG. 3 is a perspective view for explaining a manufacturing process of a stator core.
Figure 4:
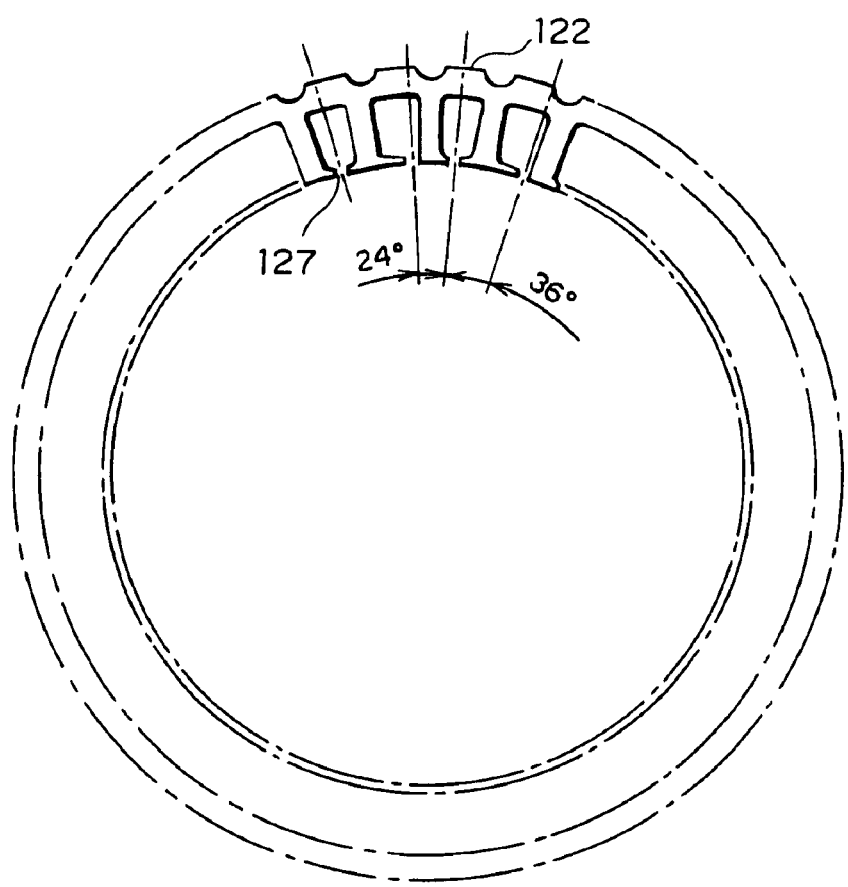
FIG. 4 is a front view of a stator core.
Figure 5:
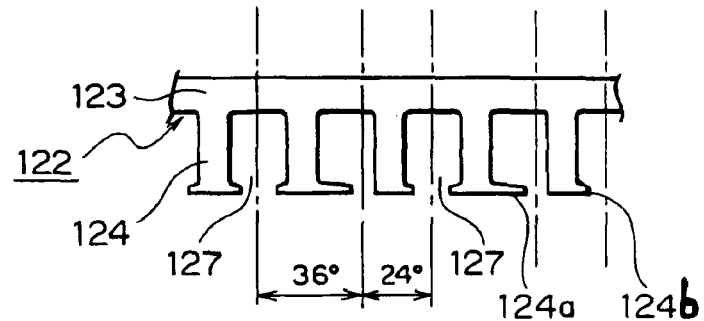
FIG. 5 is a partial enlarged view of a stator core.
Figure 6:
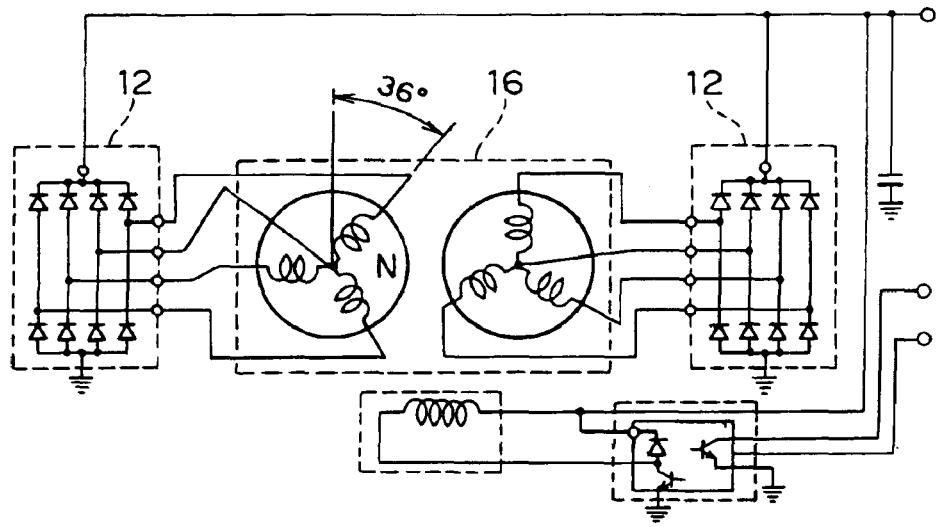
FIG. 6 is a circuit diagram of the automotive alternator according to the present invention.

FIG. 1 is a perspective view for explaining a former winding structure of a stator core applied to the stator for a automotive alternator according to the present invention. FIG. 2 is a process sectional view for explaining the manufacturing process of a stator core. FIG. 3 is a perspective view for explaining the manufacturing process of a stator core. FIG. 4 is a front view of a stator core. FIG. 5 is a partial enlarged view of a stator core. FIG. 6 is a circuit diagram of the automotive alternator according to the present invention.

As shown in FIG. 1, a stator core 122 according to the present invention is formed in a rectangular shape by laminating a predetermined number of sheets of a cold-rolled steel plate (SPCC) material, one of the low carbon steel plates, which are sheet-shaped magnetic members punched in a predetermined shape. A total number of seventy-two (72) teeth 124, which is the same as in the related art, are formed at one side of a yoke 123. Trapezoid-shaped slots 125 are formed between adjacent teeth 124.

As is shown in (a) of FIG. 2, insulators 49 are mounted in the slots 125 of the stator core 122, and straight portions of wire-strand groups 35A, 35B are inserted in each slot 125 so as to be stacked. Accordingly, as is shown in (b) of FIG. 2, wire-strand groups 35A, 35B are mounted in the stator core 122. At this time, straight portions 30b of wire-strands 30 are insulated from the stator core 122 by the insulators 49 and are received in the slots 125 so as to line up in a row in a radial direction.

Next, as is shown in FIG. 3, both end surfaces of the stator core 122 are brought together and welded, and thus a cylindrical stator core 122 is obtained, as shown in (c) of FIG. 2 and FIG. 4. By rounding the stator core 122, each slot acquires a rectangular cross-section and opening portions 127 thereof becomes smaller than the width dimension of the straight portions 30b.

FIG. 5 is a partial enlarged view of a stator core according to the present invention. In the present invention, although the total number of slots 125 is the same as that in a conventional example, 72 slots, and there are 12 rotor magnetic poles, an interval, taken from the center of air gaps of adjacent slot opening portions 127, in a circumferential direction, is uneven. That is, projections 124a, 124b extending in a circumferential direction are formed on the tips of the teeth 124 which partition the slots 125, and a mutual interval in the circumferential direction between the center of air gaps of adjacent slot opening portions 127 is varied by long and thin projections 124a and short projections 124b.

The mutual interval in the circumferential direction between the center of air gaps of adjacent slot opening portions 127 is formed by repeating 24 degrees and 36 degrees of electrical angle. Hence, as shown in FIG. 6, wound two sets of three phase stator coils have a phase difference of 36 degrees of electrical angle.

Figure 11:
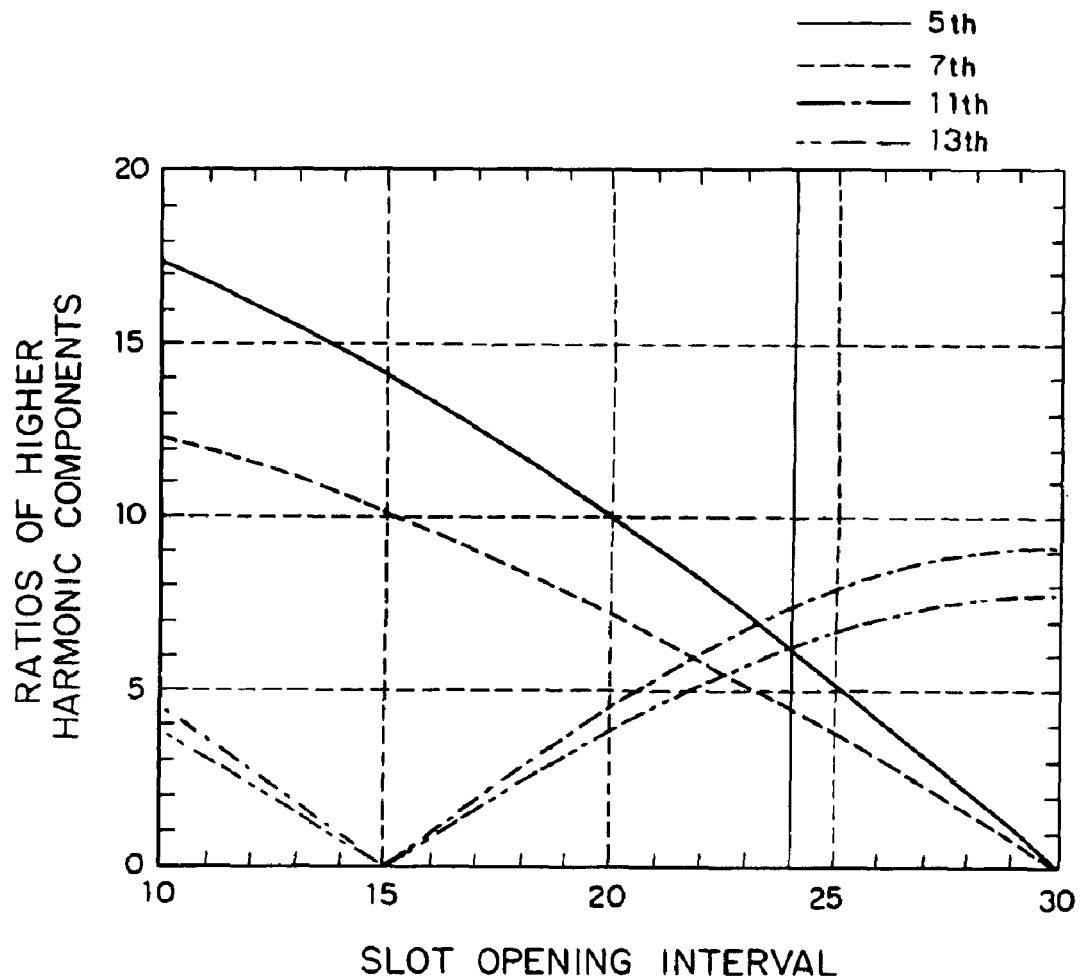
FIG. 11 is a chart showing higher harmonic components of magnetomotive force in a stator.

By making the interval in the circumferential direction between the center of air gaps of adjacent slot opening portions 127 an uneven, repeated interval of 24 degrees and 36 degrees, as shown in FIG. 11, compared to the conventional example where the electrical angle is 30 degrees, $5^{th}$, $7^{th,\ and}\ 13^{th}$ higher harmonic components of magnetomotive force in the stator 8, which is a magnetic flux density wave form, are lowered with good balance.

Moreover, generally the upper tolerance limit of these higher harmonic components is preferably set at around 13% in order to prevent occurrence of a noise which is unpleasant for passengers. Consequently, if the interval in the circumferential direction between the center of air gaps of adjacent slot opening portions 127 is in the range of from an uneven, repeated interval of 16 degrees and 44 degrees to an uneven, repeated interval of 29 degrees and 31 degrees, advantageous effects can be obtained.

Furthermore, if the interval in the circumferential direction between the center of air gaps of adjacent slot opening portions 127 is in the range of from an uneven, repeated interval of 22 degrees and 38 degrees to an uneven, repeated interval of 24 degrees and 36 degrees, the upper tolerance limit of the higher harmonic components may be set at around 8%. That is to say, $5^{th}$, $7^{th}$, $11^{th}$, and $13^{th}$ higher harmonic components may be lowered with good balance.

Also, the stator core 122 having a plurality of small thin teeth 124 in a plurality of slots is not (formed as) a conventional one-piece tubular object but is shaped from a laminated rectangular body into a cylindrical shape via a manufacturing process. Hence, mounting of the stator coils on the stator core is facilitated and the quality of the product may be improved while at the same time lowering the cost.

Moreover, although the stator core 122 according to the present invention is made into a cylindrical shape from a rectangular body, it is not necessarily limited to a rectangular body and as long as the slot opening portions 127 are in an expanded state when mounting the stators coils, the effects can be achieved. For example, similar effects can be achieved by preparing a plurality of circular shapes with a large curvature which are then combined and connected while reducing the radius of curvature.

Embodiment 2

Figure 7:
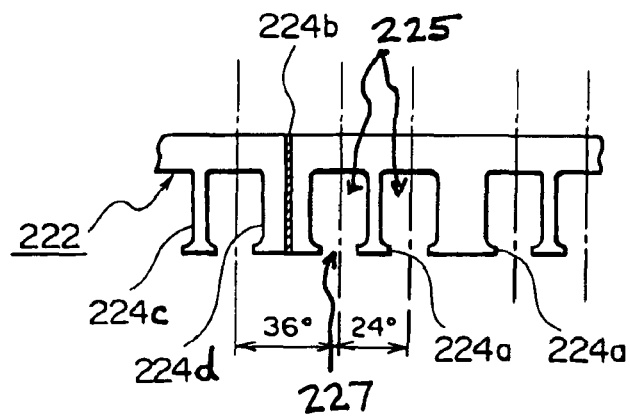
FIG. 7 is an enlarged view of an essential portion of a stator core showing another example of the stator for a automotive alternator according to the present invention.
Figure 8:
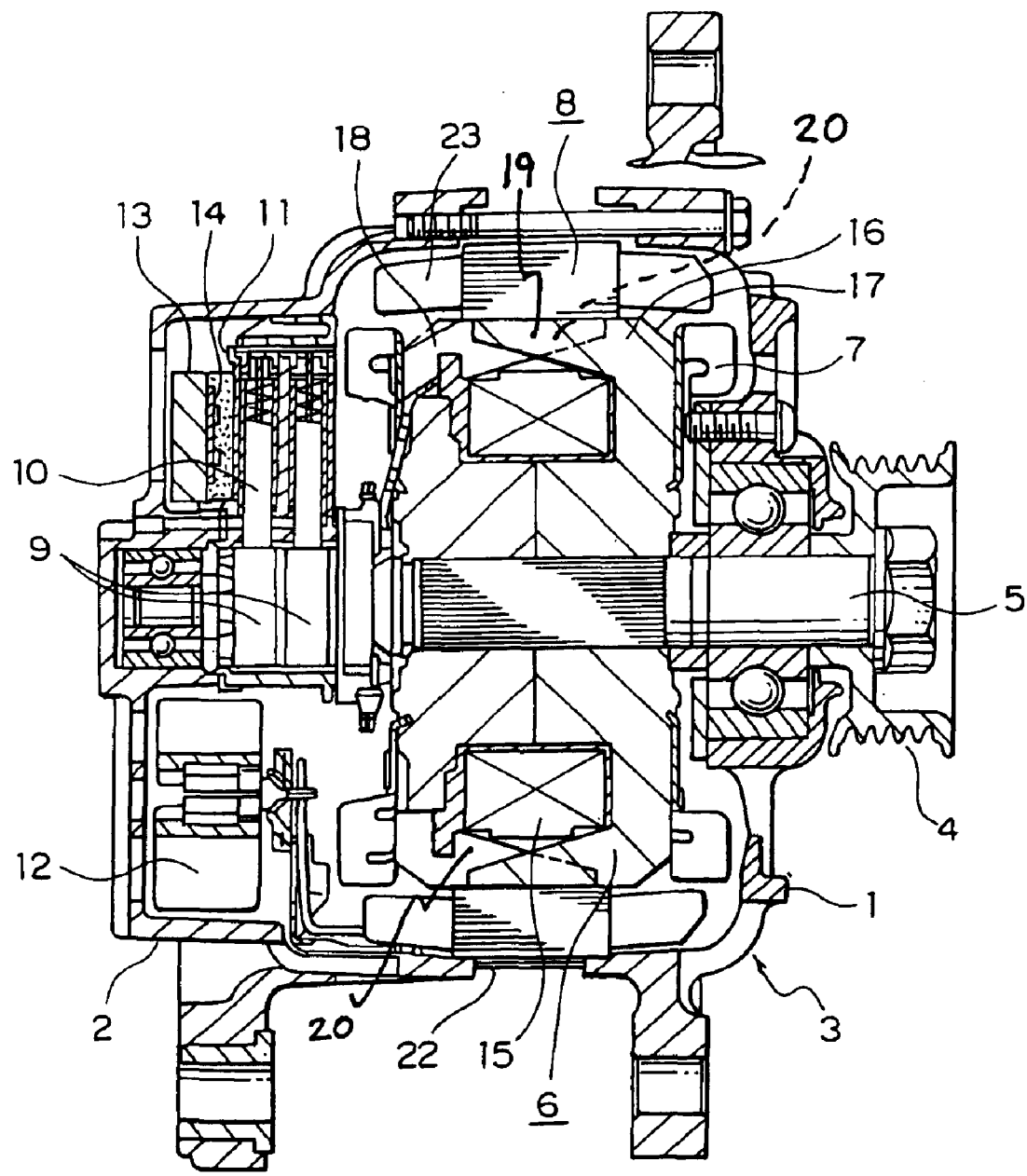
FIG. 8 is a sectional side elevation of a conventional automotive alternator.
Figure 9:
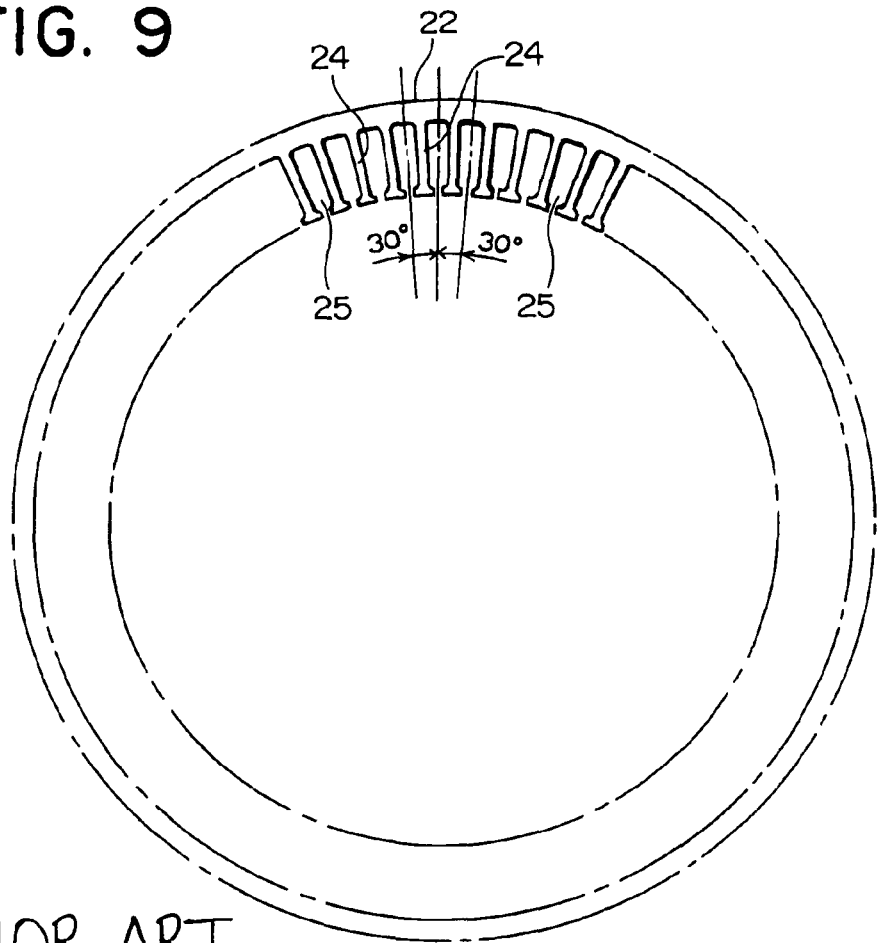
FIG. 9 is a front view of stator core applied in the stator of a conventional automotive alternator.
Figure 10:
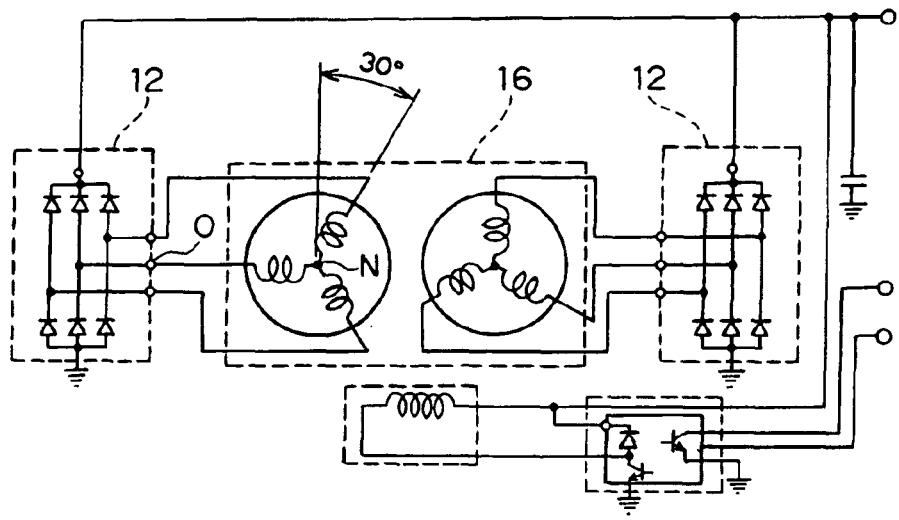
FIG. 10 is a circuit diagram of a conventional automotive alternator.

FIG. 7 is an enlarged view of an essential portion of a stator core showing another example of the stator for an automotive alternator according to the present invention. In a stator core 222 according to the present invention, adjacent teeth 224c, 224d are formed with, alternating uneven widths. Slots 225 are substantially equal in width. Slot opening portions 227 between wide teeth 224d and thin teeth 224c are comparable to air gaps of adjacent slot opening portions 127. As with slots 225, slot opening portions 227 between wide teeth 224d and thin teeth 224c have approximately the same widths, and an interval in the circumferential direction between the center of adjacent slot opening portions 227 is an uneven, repeated interval of 24 degrees and 36 degrees.

Accordingly, projections 224a extending in a circumferential direction formed in slot opening portions 227 may be formed in the same shape. Consequently, similar effects may be obtained without forming the long and thin projections 124a and short projections 124b provided in Embodiment 1.

Furthermore, in the present embodiment, a wide tooth 224d is divided in a circumferential direction by substantially orthogonal surfaces 224b. These surfaces 224b serve as contact surfaces when forming the stator core 222 into an annular shape. The stator core 222 of annular shape is produced by welding these surfaces 224b. Hence, a stator core 222 may be obtained in which the unction of the contact surfaces 224b is facilitated, the connecting operation is simplified, and joining properties thereof are high.

A stator for an automotive alternator according to the present invention is provided wherein, in an automotive alternator including:

the stator including, a stator core in which a plurality of slots extending in axial directions are formed at an inner circumference thereof and two sets of a three-phase stator coils which are fitted into the slots;

and a rotor provided inside the stator so as to be capable of rotating, including, a rotor coil for flowing a current to generate magnetic flux, and a pole core for housing the rotor coil and forming a plurality of claw-shaped magnetic poles in accordance with magnetic flux, and, 2 slots are provided for each phase of stator coils and each magnetic pole and the total number of the slots is 72 or more, the stator core is such that a plurality of sheet-shaped magnetic members with a plurality of teeth patterning the slots at one side of a yoke are laminated, the stator coils are disposed in the slots, and the stator core is rounded such that the stator coils become the inner side thereof and both end surfaces thereof are contacted to connect the stator core in an annular shape. Thus, since the stator core is divided when the stator coils are inserted therein, the installation characteristics thereof are improved.

Also, the mutual intervals in the circumferential direction between the center of air gaps of adjacently formed slot opening portions are formed to be uneven. Thus, because the stator core is divided, the mutual intervals can be made with high precision even when they are uneven and the stator core has a low rigidity.

Moreover, the interval of slot opening portions is a repeated electrical angle of α degrees and (60-α) degrees, and α degrees is in the range of from 16 to 29 degrees. Thus, $5^{th}$, $7^{th}$, $11^{th}$, and $13^{th}$ higher harmonic components may be lowered with good balance and reliability may be improved.

Also, the interval of slot opening portions is a repeated electrical angle of α degrees and (60-α) degrees, and α degrees is in the range of from 22 to 24 degrees. Thus, $5^{th}$, $7^{th}$, $11^{th}$, and $13^{th}$ higher harmonic components may be lowered with further good balance.

Further, the interval of slot opening portions is a repeated electrical angle of 24 degrees and 36 degrees. Thus, $5^{th}$, and $13^{th}$ higher harmonic components may be lowered as best as possible and reliability is improved.

Moreover, projections extending in a circumferential direction are formed on tips the teeth which partition the slots, and a mutual interval in the circumferential direction between the center of air gaps of adjacent slot opening portions is varied by projecting lengths of the projections. Thus, the desired structure may be easily achieved without additional components or large design changes.

Also, the widths of the teeth which partition the slots are uneven. Thus, the desired structure may be easily achieved without providing the protrusions of different lengths.

Furthermore, the contact surfaces of the stator core connected as an annular-shape are formed by dividing a wide tooth among the teeth of uneven widths in a circumferential with a substantially orthogonal surface. Thus the contact surfaces may be easily formed even when the teeth are thin due to a large number of slots.

What is claimed is:

1. A stator for an automotive alternator, said stator comprising:

an annular shaped stator core formed as a lamination of a plurality of sheet-shaped magnetic members, said stator core having a plurality of teeth defining a plurality of slots extending in axial directions at one side of a yoke at an inner circumference thereof, said lamination having a first end surface and a second end surface fixed directly together to form said annular shape; and two sets of three-phase stator coils fitted into said slots, wherein 2 slots are provided for each phase of said stator coils and each magnetic pole and the total number of the slots is at least 72 or more, wherein an interval in the circumferential direction between a center of air gaps of adjacently formed slot opening portions is alternated.

2. A stator for an automotive alternator according to claim 1, wherein said interval is a repeated electrical angle of α degrees and (60-α) degrees, and said α degrees is in a range of from 16 to 29 degrees.

3. A stator for an automotive alternator according to claim 1, wherein said interval is a repeated electrical angle of α degrees and (60-α) degrees, and said α degrees is in a range of from 22 to 24 degrees.

4. A stator for an automotive alternator according to claim 1, wherein said interval is a repeated electrical angle of 24 degrees and 36 degrees.

5. A stator for an automotive alternator, said stator comprising:

an annular shaped stator core formed as a lamination of a plurality of sheet-shaped magnetic members, said stator core having a plurality of teeth defining a plurality of slots extending in axial directions at one side of a yoke at an inner circumference thereof, and end surfaces fixed together to complete said annular shape; and two sets of three-phase stator coils fitted into said slots, wherein 2 slots are provided for each phase of said stator coils and each magnetic pole and the total number of the slots is 72 or more, and wherein widths of said teeth which define said slots alternate in size in a circumferential direction so that an interval in the circumferential direction between a center of air gaps of adjacently formed slot opening portions is an alternating electrical angle of α degrees and (60-α) degrees, and said α degrees is in a range from 16–29 degrees.

6. The stator for an automotive alternator according to claim 5, wherein said α degrees is in a range of from 22 to 24 degrees.

7. The stator for an automotive alternator according to claim 5, wherein said interval is an alternating electrical angle of 24 degrees and 36 degrees.

8. A stator for an automotive alternator, said stator comprising:

an annular shaped stator core formed as a lamination of a plurality of sheet-shaped magnetic members, said stator core having a plurality of teeth defining a plurality of slots extending in axial directions at one side of a yoke at an inner circumference thereof, and end surfaces fixed together to complete said annular shape; and two sets of three-phase stator coils fitted into said slots, wherein 2 slots are provided for each phase of said stator coils and each magnetic pole and the total number of the slots is 72 or more, wherein widths of said teeth which define said slots alternate in size in a circumferential direction, and wherein contact surfaces of said stator core, when said stator core is connected as an annular shape, are formed by dividing a wide tooth among said teeth of alternating widths in a circumferential direction with a substantially orthogonal surface.

9. A stator for an automotive alternator, said stator comprising:

a stator core in which a plurality of slots extending in axial directions are formed at an inner circumference thereof, a plurality of teeth defining and partitioning said slots; and two sets of three-phase stator coils which are fitted into said slots, wherein 2 slots are provided for each phase of said stator coils and each magnetic pole and the total number of the slots is 72 or more, and wherein a first set of said teeth each including first and second projections extend in a circumferential direction, said first and second projections having different lengths so that an interval in a circumferential direction between a center of air gaps of adjacently formed slot opening portions between said teeth is alternated.

10. The stator for an automotive alternator according to claim 9, wherein said interval is an alternating electrical angle of α degrees and (60-α) degrees, and said α degrees is in a range from 16–29 degrees.

11. The stator for an automotive alternator according to claim 9, wherein said interval of is an alternating electrical angle of α degrees and (60-α) degrees, and said α degrees is in a range of from 22 to 24 degrees.

12. The stator for an automotive alternator according to claim 9, wherein said interval is an alternating electrical angle of 24 degrees and 36 degrees.

13. A stator for an automotive alternator, said stator comprising:

an annular shaped stator core having a plurality of teeth defining a plurality of slots extending in axial directions at one side of a yoke at an inner circumference thereof; and two sets of three-phase stator coils fitted into said slots, wherein an interval in the circumferential direction between a center of air gaps of adjacently formed slot opening portions is an alternating electrical angle of α degrees and (60-α) degrees, and said α degrees is in a range from 16–29 degrees.

14. The stator for an automotive alternator according to claim 13, wherein said α degrees is in a range of from 22 to 24 degrees.

15. The stator for an automotive alternator according to claim 13, wherein said interval is alternating electrical angle of 24 degrees and 36 degrees.

16. The stator for an automotive alternator according to claim 13, wherein 2 slots are provided for each phase of said stator coils and each magnetic pole and the total number of the slots is 72 or more.

17. The stator for an automotive alternator according to claim 13, wherein widths of said teeth which define said slots alternate in size in a circumferential direction to define said alternating electrical angle.

* * * * *